United States Patent
Yu et al.

(10) Patent No.: US 8,959,273 B2
(45) Date of Patent: Feb. 17, 2015

(54) COMPOSITE DATA TRANSMISSION INTERFACE AND A JUDGMENT METHOD THEREOF

(75) Inventors: Hong-Chi Yu, Kaohsiung (TW); Mao-Ting Chang, Kaohsiung (TW)

(73) Assignee: Walton Advanced Engineering Inc., Kaohsiung (TW)

( * ) Notice: Subject to any disclaimer, the term of this patent is extended or adjusted under 35 U.S.C. 154(b) by 234 days.

(21) Appl. No.: 13/590,391

(22) Filed: Aug. 21, 2012

(65) Prior Publication Data
US 2014/0032809 A1  Jan. 30, 2014

(30) Foreign Application Priority Data

Jul. 24, 2012  (TW) .............................. 101126551 A

(51) Int. Cl.
*H04L 9/32*  (2006.01)

(52) U.S. Cl.
CPC ...... *H04L 9/3234* (2013.01); *G06F 2213/0042* (2013.01)
USPC ............................. 710/315; 235/375; 235/382

(58) Field of Classification Search
CPC ............................. H04L 9/0877; H04L 9/3234

USPC ................................... 235/375, 382; 710/315
See application file for complete search history.

(56) References Cited

U.S. PATENT DOCUMENTS

| 8,151,345 | B1 * | 4/2012 | Yeager ............................ 726/20 |
| 8,488,327 | B2 * | 7/2013 | Garnier ........................ 361/736 |
| 2004/0073726 | A1 * | 4/2004 | Margalit et al. .................. 710/72 |
| 2009/0043918 | A1 * | 2/2009 | Schroeder ........................ 710/11 |
| 2014/0024226 | A1 * | 1/2014 | Augustinowicz ............... 439/38 |

FOREIGN PATENT DOCUMENTS

| GB | 2427047 A  * 12/2006 | ........... G06K 19/077 |
| WO | WO 01/96990 A2  * 12/2001 | ................ G06F 1/00 |

\* cited by examiner

*Primary Examiner* — Glenn A Auve
(74) *Attorney, Agent, or Firm* — Bacon & Thomas, PLLC

(57) ABSTRACT

The present invention relates to a composite data transmission interface and a judgment method thereof which is based on metal contacts shared by a smart card and a USB and comprise steps as follows: link a composite pin to a socket; electrical conductivity is completed with a socket linking a composite pin; a controller connected to the composite pin is activated by electricity; a smart card's or a USB's electrical conductivity mode is enabled by the controller by means of the smart card's or the USB's electrical connection mode.

7 Claims, 4 Drawing Sheets

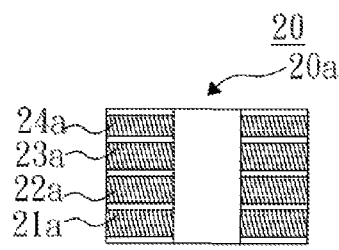
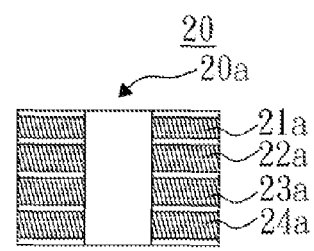
FIG. 3a  FIG. 3b
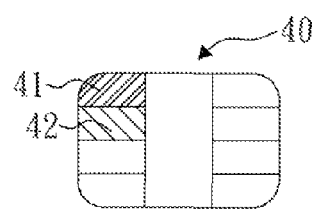
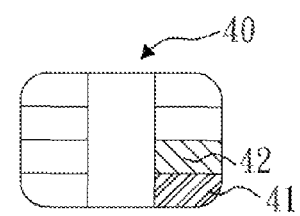
FIG. 3c  FIG. 3d
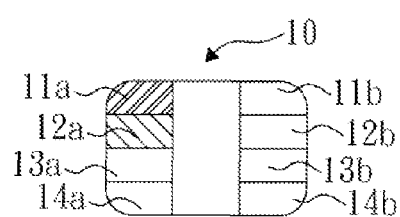
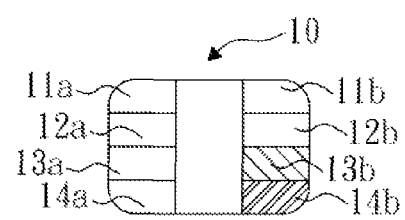
FIG. 3e  FIG. 3f

US 8,959,273 B2

COMPOSITE DATA TRANSMISSION INTERFACE AND A JUDGMENT METHOD THEREOF

BACKGROUND OF THE INVENTION

1) Field of the Invention

The present invention provides a composite data transmission interface and a judgment method thereof for switching interfaces between operating modes of a smart card or a Universal Serial Bus (USB) according to pinouts of electrical conductivity or signal transmission so that electrical conductivity is completed by the controller referring to an operating mode.

2) Description of the Prior Art

With Internet prevailing in this era, cash flow between banks, communication channels or news information has been dramatically changed. For instance, cash transferred between different bank accounts is electronically available to smart cards and Internet via a terminal; conventional communication channels such as mail have been replaced or unavailable in the market due to emergence of various technologies, e.g., e-mail, instant messaging or Voice over Internet Protocol (VoIP); mainstream media such as TV station and newspaper does not dominate news information.

Internet-based cash flow, communication channels or news information has brought advantages such as instantaneity, convenience and lowered use cost. Similarly, Internet-based functions still have disadvantages like conventional methods. As a gigantic network, Internet constructed by linking sub-networks features information leakage, for example, unencrypted information about Internet-based cash flow between banks or individual messages in unsafe instant messaging or media communication is easily caught by or exposed to cyber criminals.

In order to promote security of Internet-based transactions and identify users, each bank usually offers one user an extra flash drive including a private key in addition to an existing smart card. However, this extra tool such as flash drive which is inconveniently held in a purse has become a minor problem in handling or even a trouble after it was lost.

Additionally, how to reduce costs in offering and managing flash drives is also an issue. As indicated in the last paragraph, a flash drive with a thickness conforming to existing specifications might not be properly held in a purse or a pocket.

SUMMARY OF THE INVENTION

In order to solve the abovementioned problems, the present invention provides a composite data transmission interface and a judgment method thereof to decide an operating mode for a smart card or a Universal Serial Bus (USB) in accordance with pinouts of electrical conductivity or signal transmission so that electrical conductivity is completed by the controller referring to an operating mode.

Accordingly, the object of the present invention is to provide a composite data transmission interface and a judgment method thereof which are effective in integrating two specifications of a smart card and a USB.

The other object of the present invention is to provide a composite data transmission interface and a judgment method thereof which obviously simplify two types of circuitry and reduce manufacture costs.

The further object of the present invention is to provide a composite data transmission interface and a judgment method thereof which simplify individual controllers for a smart card and a USB into one unit of controller.

The yet other object of the present invention is to provide a composite data transmission interface and a judgment method thereof which simplify individual metal contacts for a smart card and a-USB into one unit of metal contacts.

The yet still other object of the present invention is to provide a composite data transmission interface and a judgment method thereof which simplify material management by integration of two types of specifications.

The yet still further object of the present invention is to provide a composite data transmission interface and a judgment method thereof which contribute to portability and availability with two types of specifications integrated.

The yet still further object of the present invention is to provide a composite data transmission interface and a judgment method thereof which secure ordinary Internet-based transactions with two types of specifications integrated.

The present invention depends on the following technical manners to achieve the above objects. The present invention of a composite data transmission interface is compatible to both a smart card and a USB and comprises: (a) an electrical control module with a substrate and at least a controller installed on a lower surface of the substrate; (b) an electrical contact module installed on an upper surface of the substrate and positioned at one side of the upper surface on which there are a first pinout contact, a second pinout contact, a third pinout contact and a fourth pinout contact in order and at the other side of the upper surface on which there are a fifth pinout contact, a sixth pinout contact, a seventh pinout contact and an eighth pinout contact in order wherein the first pinout contact, the second pinout contact, and the third pinout contact correspond to the fifth pinout contact, the sixth pinout contact, and the seventh pinout contact, respectively. The electrical contact module is electrically connected to the controller via the substrate; the present invention features the method of signal processing which is changed in the controller with signals delivered to the controller via the electrical contact module.

The objects and technical issues of the present invention are further achieved with the following technical steps.

In the abovementioned composite data transmission interface, the electrical control module is covered with an encapsulant body.

The present invention is also a judgment method of a composite data transmission interface based on metal contacts shared by a smart card and a-USB and comprises steps as follows: (a) Step 1: link a composite pin to a socket; Step 2: a first socket contact and a fourth socket contact on the socket are electrically connected to a first pinout contact (or an eighth pinout contact) and a fourth pinout contact (or a fifth pinout contact) on the composite pin, respectively; Step 3: a controller connected to the composite pin is activated by electricity which is delivered via the first socket contact, the fourth socket contact, the fifth pinout contact or the eighth pinout contact; Step 4: the controller based on a smart card's electrical connection model is activated to be the smart card's electrical conductivity mode; Step 5: the controller based on a USB's electrical connection model is activated to be the USB's electrical conductivity mode.

The objects and technical issues of the present invention are further achieved with the following technical steps.

In the abovementioned judgment method of a composite data transmission interface, electrical conductivity in a smart card's electrical connection mode in Step 4 is achieved by the controller via the first pinout contact or the eighth pinout contact.

In the abovementioned judgment method of a composite data transmission interface, signal transmission in a smart card's electrical connection mode in Step 4 is achieved by the controller via a second pinout contact or a seventh pinout contact.

In the abovementioned judgment method of a composite data transmission interface, electrical conductivity in a USB's electrical connection mode in Step 5 is achieved by the controller via the fourth pinout contact or the fifth pinout contact.

In the abovementioned judgment method of a composite data transmission interface, signal transmission in a USB's electrical connection mode in Step 5 is achieved by the controller via the second pinout contact and the third pinout contact (or the sixth pinout contact and the seventh pinout contact).

In contrast to prior arts, the present invention is effective in (1) two interface functions completed in one unit of metal contacts; (2) control of two interfaces completed in one unit of controller; (3) reduced manufacture costs due to simplified materials; (4) portability and availability with two types of interfaces integrated; (5) conforming to specifications of two types of interfaces for existing equipment; (6) security of Internet-based transactions in virtue of a private key offered to a flash drive.

BRIEF DESCRIPTIONS OF THE DRAWINGS

FIG. 3a is a schematic diagram illustrating the smart card socket of the present invention in a preferred embodiment.

FIG. 3b is a schematic diagram illustrating the smart card socket of the present invention rotated 180 degrees in a preferred embodiment.

FIG. 3c is a schematic diagram illustrating the smart card of the present invention in a preferred embodiment.

FIG. 3d is a schematic diagram illustrating the smart card of the present invention rotated 180 degrees in a preferred embodiment.

FIG. 3e is a first corresponding schematic diagram of the present invention in a preferred embodiment.

FIG. 3f is a second corresponding schematic diagram of the present invention in a preferred embodiment.

DETAILED DESCRIPTIONS OF THE PREFERRED EMBODIMENTS

Figure 1:
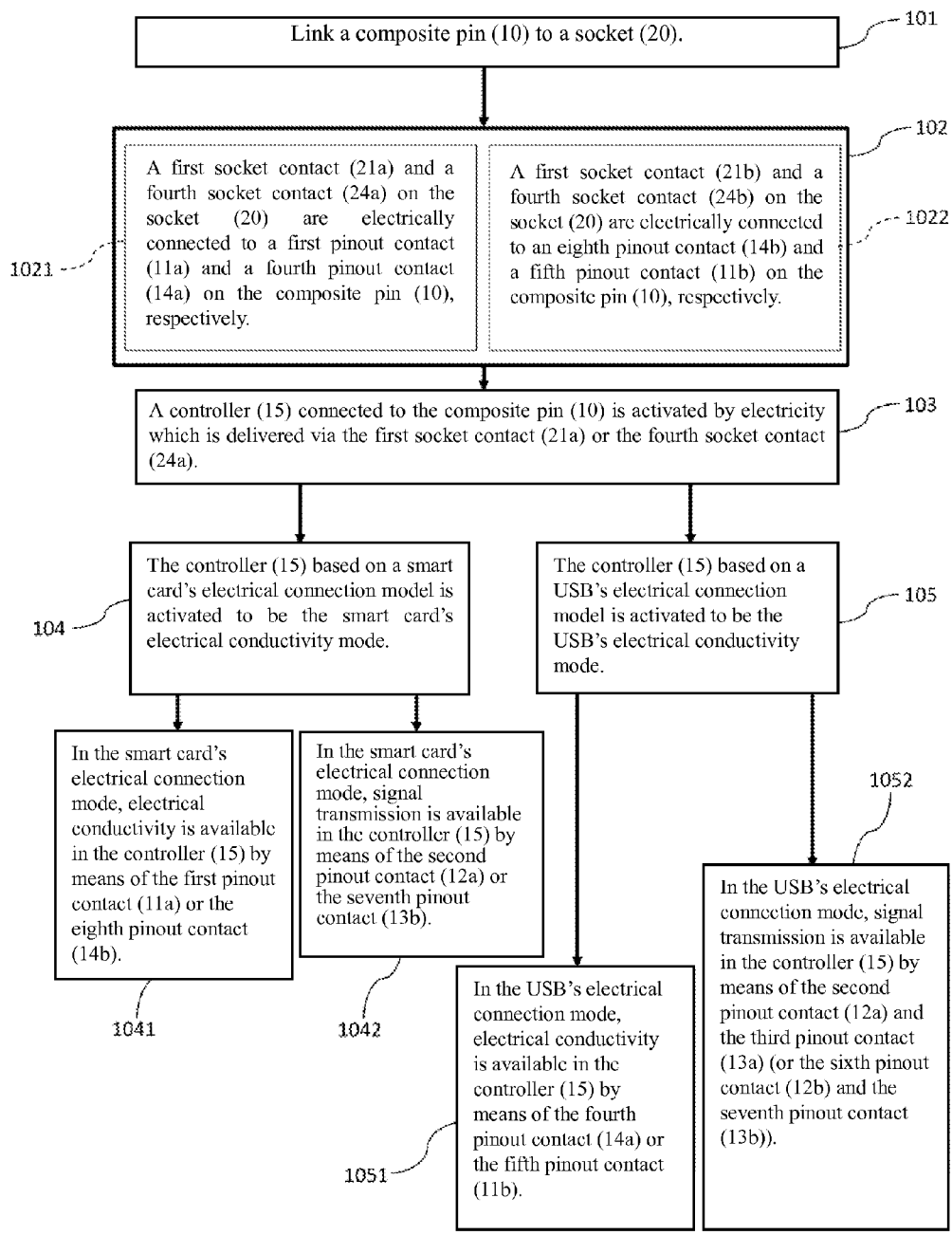
FIG. 1 is a flow chart of the present invention in a preferred embodiment.
Figure 2A:
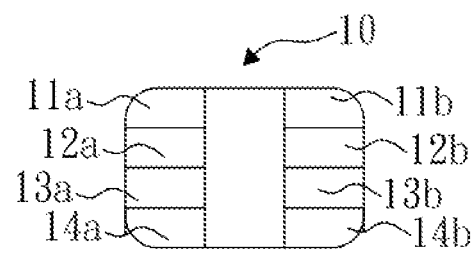
FIG. 2a is a top view of the present invention in a preferred embodiment.
Figure 2B:
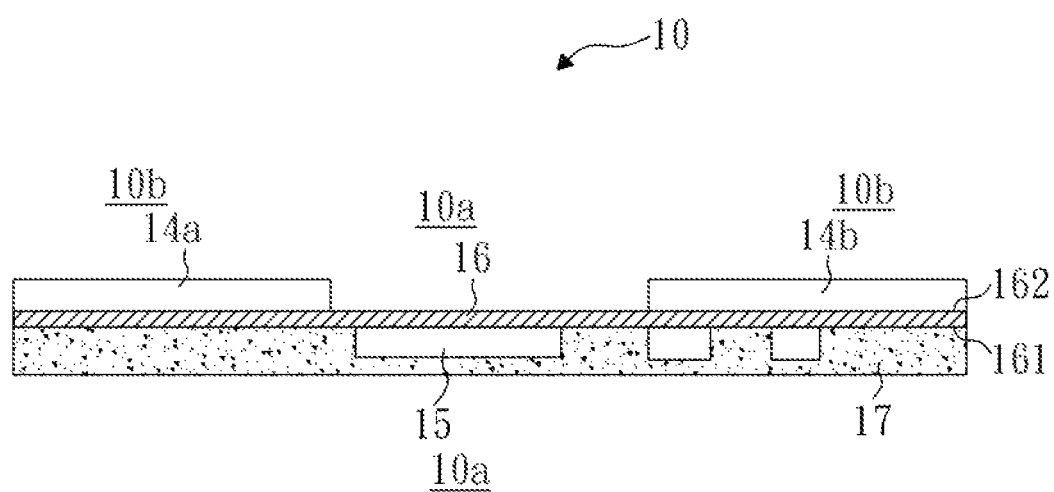
FIG. 2b is a sectional view of the present invention in a preferred embodiment.

For objects, characteristics and effects obviously and easily understood, the preferred embodiments for the present invention are particularly interpreted as follows:

The main embodiments for the present invention of a composite data transmission interface and a judgment method thereof are shown in FIG. 1 through FIG. 4f. Referring to FIGS. 2a and 2b which illustrate the present invention of a composite data transmission interface (10) comprises an electrical control module (10a) and an electrical contact module (10b): (a) the electrical control module (10a) comprises at least a controller (15) and a substrate (16) wherein the controller (15) is installed on a lower surface (161) of the substrate (16); (b) the electrical contact module (10b) is disposed on an upper surface (162) of the substrate (16), electrically connected to the controller (15) via the substrate (16), and positioned at one side of the upper surface (162) on which there are a first pinout contact (11a), a second pinout contact (12a), a third pinout contact (13a) and a fourth pinout contact (14a) in order; the electrical contact module (10b) is also positioned at the other side of the upper surface (162) on which there are a fifth pinout contact (11b), a sixth pinout contact (12b), a seventh pinout contact (13b) and an eighth pinout contact (14b) in order. Furthermore, the first pinout contact (11a), the second pinout contact (12a), and the third pinout contact (13a) correspond to the fifth pinout contact (11b), the sixth pinout contact (12b), and the seventh pinout contact (13b), respectively.

Specifically, the first pinout contact (11a), the second pinout contact (12a), the third pinout contact (13a) and the fourth pinout contact (14a) are electrically connected and compatible to a-Universal Serial Bus (USB); the fifth pinout contact (11b), the sixth pinout contact (12b), the seventh pinout contact (13b) and the eighth pinout contact (14b) are also electrically connected and compatible to a USB. Furthermore, the first pinout contact (11a), the second pinout contact (12a), the third pinout contact (13a), the fourth pinout contact (14a), the fifth pinout contact (11b), the sixth pinout contact (12b), the seventh pinout contact (13b) and the eighth pinout contact (14b) are electrically connected and compatible to a smart card in conformity with ISO 7816. A method that the controller (15) processes signals by means of either a USB or a smart card depends on those signals delivered to the controller (15) via the abovementioned metal contacts and the electrical contact module (10b). The electrical control module (10a) is covered with an encapsulant body (17) as an outer protective layer.

Referring to FIG. 1 which illustrates the present invention of a judgment method of a composite data transmission interface wherein the method is based on metal contacts shared by a smart card and a USB and includes steps as follows:

(a) link a composite pin (10) to a socket (20) (Step 1: 101); (b) a first socket contact (21a, 21b) and a fourth socket contact (24a, 24b) on the socket (20) are electrically connected to a first pinout contact (11a) (or an eighth pinout contact (14b)) and a fourth pinout contact (14a) (or a fifth pinout contact (11b)) on the composite pin (10), respectively (Step 2: 102); (c) a controller (15) connected to the composite pin (10) is activated by electricity which is delivered via the first socket contact (21a, 21b), the fourth socket contact (24a, 24b), the fifth pinout contact (11b) or the eighth pinout contact (14b) (Step 3: 103); (d) the controller (15) based on a smart card's electrical connection model is activated to be the smart card's electrical conductivity mode (Step 4: 104) or the controller (15) based on a USB's electrical connection model is activated to be the USB's electrical conductivity mode (Step 5: 105).

Specifically, Step 2 includes two active conditions as shown in FIG. 1. The first socket contact (21a, 21b) and the fourth socket contact (24a, 24b) on the socket (20) are electrically connected to the first pinout contact (11a) and the fourth pinout contact (14a) on the composite pin (10), respectively (Step 2-1: 1021). Alternatively, the first socket contact (21a, 21b) and the fourth socket contact (24a, 24b) on the socket (20) are electrically connected to the eighth pinout contact (14b) and the fifth pinout contact (11b) on the composite pin (10), respectively (Step 2-2: 1022).

More specifically, referring to FIGS. 3a, 3c and 3e which illustrate electricity is first supplied to a first contact (41) of a conventional smart card (40) via a first socket contact (21a) of a smart card socket (20a) for driving internal electronic components and delivering signals to a second contact (22a) of the smart card socket (20a) via a second contact (42) of the conventional smart card (40). FIGS. 3b, 3d and 3f also illustrate corresponding relationships between the socket (20) (the conventional smart card (40)) rotated 180 degrees and the present invention (10). It can be seen that electricity conductivity and signal transmission of the present invention (10) are available in the first pinout contact (11a) (or the eighth pinout contact (14b)) and the second pinout contact (12a) (or the seventh pinout contact (13b)), respectively.

Furthermore, a smart card's electrical connection modes are divided into two patterns, electrical conductivity (Step 4-1: 1041) and signal transmission (Step 4-2: 1042) as shown in FIG. 1. In the smart card's electrical connection mode, electrical conductivity is available in the controller (15) by means of the first pinout contact (11a) or the eighth pinout contact (14b). In a further aspect, signal transmission in the smart card's electrical connection mode is available in the controller (15) by means of the second pinout contact (12a) or the seventh pinout contact (13b).

Figure 4A:
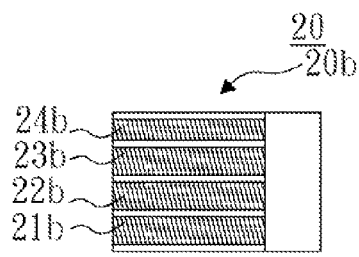
FIG. 4a is a schematic diagram illustrating the USB socket of the present invention in a preferred embodiment.
Figure 4B:
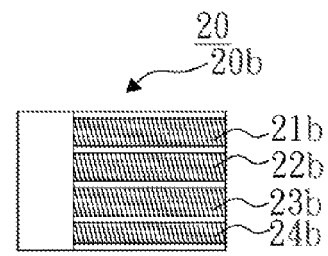
FIG. 4b is a schematic diagram illustrating the USB socket of the present invention rotated 180 degrees in a preferred embodiment.
Figure 4C:
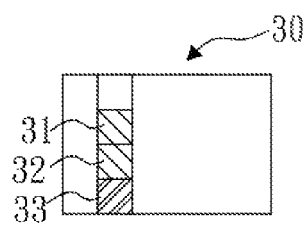
FIG. 4c is a schematic diagram of the USB of the present invention in a preferred embodiment.
Figure 4D:
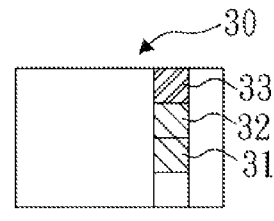
FIG. 4d is a schematic diagram illustrating the USB of the present invention rotated 180 degrees in a preferred embodiment.
Figure 4E:
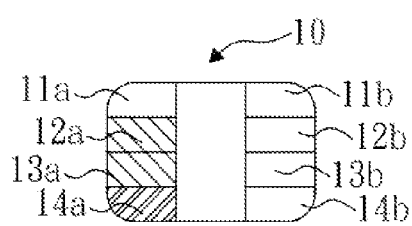
FIG. 4e is a third corresponding schematic diagram of the present invention in a preferred embodiment.
Figure 4F:
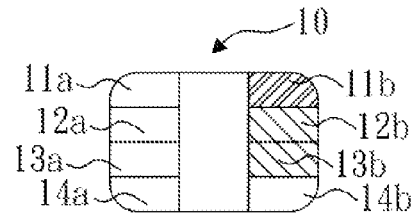
FIG. 4f is a fourth corresponding schematic diagram of the present invention in a preferred embodiment.

Specifically, referring to FIGS. 4a, 4c and 4e which illustrate electricity is first supplied to a fourth contact (33) of a conventional USB (30) via a fourth socket contact (24b) of a USB socket (20b) for driving internal electronic components and delivering signals to a second socket contact (22b) or a third socket contact (23b) on the USB socket (20b) via a second contact (31) or a second contact (32) on the conventional USB (30). FIGS. 4b, 4d and 4f also illustrate corresponding relationships between the socket (20) (the conventional USB (30)) rotated 180 degrees and the present invention (10). It can be seen that electricity conductivity and signal transmission of the present invention (10) are available in the fourth pullout contact (14a) (or the fifth pinout contact (11b)) and the second pinout contact (12a) plus the third pinout contact (13a) (or the sixth pinout contact (12b) plus the seventh pinout contact (13b)), respectively.

Similarly, a USB's electrical connection modes are divided into two patterns, electrical conductivity (Step 5-1: 1051) and signal transmission (Step 5-2: 1052), as shown in FIG. 1. In the USB's electrical connection mode, electrical conductivity is available in the controller (15) by means of the fourth pinout contact (14a) or the fifth pinout contact (11b). In a further aspect, signal transmission in the USB's electrical connection mode is available in the controller (15) by means of the second pinout contact (12a) and the third pinout contact (13a) (or the sixth pinout contact (12b) and the seventh pinout contact (13b)).

In this context, the operating voltages for a smart card and a USB are 3 Volts (or 5 Volts) and 5 Volts, respectively. Therefore, an interface to be used, either a smart card or a USB, is decided according to either a voltage or signal difference, for instance, half-duplex differential signals for a USB or square signals for a smart card.

As a result, the present invention with some effects different from a conventional smart card or a USB and referred to as creative work meets patentability and is applied for the patent.

It must be stressed that the above disclosures demonstrate the preferred embodiments of the present invention only and any equivalent change in patent specifications, claims or drawings with respect to the present invention is still within the technical scope protected by the present invention which refers to claims hereinafter.

What is claimed is:

1. A composite data transmission interface (10) compatible to both a smart card and a Universal Serial Bus (USB) and comprising:
    an electrical control module (10a) with at least a controller (15) and a substrate (16) wherein the controller (15) is installed on a lower surface (161) of said substrate (16);
    an electrical contact module (10b) installed on an upper surface (162) of said substrate (16) and positioned at one side of said upper surface (162) on which there are a first pinout contact (11a), a second pinout contact (12a), a third pinout contact (13a) and a fourth pinout contact (14a) in order and also at another side of said upper surface (162) on which there are a fifth pinout contact (11b), a sixth pinout contact (12b), a seventh pinout contact (13b) and an eighth pinout contact (14b) wherein said first pinout contact (11a), said second pinout contact (12a) and said third pinout contact (13a) correspond to said fifth pinout contact (11b), said sixth pinout contact (12b) and said seventh pinout contact (13b), respectively;
    said electrical contact module (10b) electrically connected to said controller (15) via said substrate (16);
    said composite data transmission interface (10) features a method of signal processing which is changed in said controller (15) with signals delivered to said controller (15) via said electrical contact module (10b).

2. The composite data transmission interface (10) according to claim 1 wherein said electrical control module (10a) is covered with an encapsulant body (17).

3. A judgment method of a composite data transmission interface based on metal contacts shared by a smart card and a USB and including steps as follows:
    Step 1: link a composite pin (10) to a socket (20);
    Step 2: a first socket contact (21a, 21b) and a fourth socket contact (24a, 24b) on said socket (20) are electrically connected to a first pinout contact (11a) (or an eighth pinout contact (14b)) and a fourth pinout contact (14a) (or a fifth pinout contact (11b)) on the composite pin (10), respectively;
    Step 3: a controller (15) connected to said composite pin (10) is activated by electricity which is delivered via said first socket contact (21a, 21b), said fourth socket contact (24a, 24b), said fifth pinout contact (11b) or said eighth pinout contact (14b);
    Step 4: said controller (15) based on a smart card's electrical connection model is activated to be said smart card's electrical conductivity mode
    Step 5: or said controller (15) based on a USB's electrical connection model is activated to be said USB's electrical conductivity mode.

4. The judgment method of said composite data transmission interface according to claim 3 wherein said smart card's electrical connection mode in Step 4 is electrical conductivity of said controller (15) via said first pinout contact (11a) or said eighth pinout contact (14b).

5. The judgment method of said composite data transmission interface according to claim 3 wherein said smart card's electrical connection mode in Step 4 is signal transmission of said controller (15) via said second pinout contact (12a) or said seventh pinout contact (13b).

6. The judgment method of said composite data transmission interface according to claim 3 wherein said USB's electrical connection mode in Step 5 is electrical conductivity of said controller (15) via said fourth pinout contact (14*a*) or said fifth pinout contact (11*b*).

7. The judgment method of said composite data transmission interface according to claim 3 wherein said USB's electrical connection mode in Step 5 is signal transmission of said controller (15) via either said second pinout contact (12*a*) plus said third pinout contact (13*a*) or said sixth pinout contact (12*b*) plus said seventh pinout contact (13*b*).

* * * * *